(12) United States Patent
Yang

(10) Patent No.: US 6,707,197 B2
(45) Date of Patent: Mar. 16, 2004

(54) MOTOR HOUSING

(75) Inventor: Chih-Chang Yang, Taoyuan (TW)

(73) Assignee: Lidashi Industry Co., Ltd., Bade (TW)

( * ) Notice: Subject to any disclaimer, the term of this patent is extended or adjusted under 35 U.S.C. 154(b) by 68 days.

(21) Appl. No.: 10/274,958

(22) Filed: Oct. 22, 2002

(65) Prior Publication Data

US 2003/0107279 A1 Jun. 12, 2003

(30) Foreign Application Priority Data

Nov. 6, 2001 (TW) ........................................ 90218982 U

(51) Int. Cl.[7] ................................................. H02K 5/00
(52) U.S. Cl. .............................. 310/89; 310/51; 310/90
(58) Field of Search ............................. 310/89, 51, 88, 310/90, 91

(56) References Cited

U.S. PATENT DOCUMENTS

| | | | | |
|---|---|---|---|---|
| 4,636,669 A | * | 1/1987 | Plunkett et al. | 310/51 |
| 4,800,309 A | * | 1/1989 | Lakin | 310/90 |
| 5,015,155 A | * | 5/1991 | Brown | 417/360 |
| 5,019,735 A | * | 5/1991 | Lee | 310/89 |
| 5,045,736 A | * | 9/1991 | Amano et al. | 310/88 |
| 5,767,596 A | * | 6/1998 | Stark et al. | 310/89 |
| 5,861,689 A | * | 1/1999 | Snider et al. | 310/71 |
| 6,400,051 B1 | * | 6/2002 | Hsieh | 310/89 |
| 6,552,464 B1 | * | 4/2003 | Rahbar et al. | 310/239 |

* cited by examiner

Primary Examiner—Thanh Lam
(74) Attorney, Agent, or Firm—Bacon & Thomas, PLLC

(57) ABSTRACT

The present invention is to provide a motor housing including two cover shells each having a hollow cover body and mounts mounted on the outer periphery thereof. The present invention is characterized in that at least one of the two cover shells has at least two ledges, which protrude outwardly from an edge of an opening of the cover body. The mounts are respectively provided on outer sides of the ledges and respectively have a first matching portion at an end of the mount of the first cover shell and a second matching portion at an end of the mount of the second cover shell. The two cover shells are connected with two ends of a stator of the motor by the ends of the mounts of the two cover shells are contacted to each other in pairs and are fastened with each other by screws.

3 Claims, 4 Drawing Sheets

US 6,707,197 B2

MOTOR HOUSING

FIELD OF THE INVENTION

The present invention relates generally to a motor, and more particularly to an improved motor housing structure.

BACKGROUND OF THE INVENTION

A conventional two-piece motor housing includes two cover shells, each of which is substantially a hollow cover body and has an annular stepped portion at an inner wall thereof and an axle hole at a bottom center thereof. A plurality of mounts are integrally connected with an outer periphery of the cover body and are substantially equiangularly arranged and respectively have a through hole or a threaded hole parallel to a longitudinal axle of the motor housing. In process of assembling, one of the cover shells is first sleeved onto an end of a cylindrical stator of a motor with the annular stepped portion engaged against an outer fringe of the end of the stator, and then a rotor of the motor is inserted into the stator by the way of an end of the rotor running out of the axle hole of the cover shell. And the other cover shell is fit with the aforesaid cover shell by inserting the other end of the rotor through the axle hole thereof and the annular stepped portion thereof engaged against the other end of the stator. The two cover shells clamp the two ends of the stator, and an outer periphery of the stator is partially exposed between the two cover shells.

In the process of being threadedly-engaged, since the mounts of the two cover shells are spaced in a predetermined distance, which is namely an exposed portion of the stator, operators have to fit the second cover shell to the first cover shell by rotating the cover shells to make the mounts of the two cover shells in alignment with each other and by inserting a screw into the through hole or the threaded hole, such that the two cover shells are threadedly engaged and are fit tightly with the stator. The operators have to carefully align all the mounts of the two cover shells with each other in the foregoing process, which works inconveniently and inefficiently.

Furthermore, the two cover shells are made by casting such that there is a dimensional deviation between the two cover shells. While the motor housing is assembled, the two cover shells are not entirely engaged and the stator is positioned between them and further there are dimensional deviations among different stators. Accordingly, a deviation of the distance between two ends of the two cover shells is a total amount of the two dimensional deviations of two cover shells and the stator, such that a length of the rotor extending out of the cover shells is variational and the precision of the motor goes down.

SUMMARY OF THE INVENTION

The primary objective of the present invention is to provide an improved motor housing, which facilitates and accelerates the assembling process to be timesaving and high productive.

Another objective of the present invention is to provide an improved motor housing, which has fewer deviation of the length between two ends of the motor housing and higher precision of the products.

The foregoing objectives are attained by an improved motor housing of the present invention, which comprises two cover shells respectively having a hollow cover body with an opening and mounts mounted on the outer periphery of the cover body. The present invention is characterized in that at least one of the two cover shells has at least two ledges, which protrude outwardly from an edge of the opening of the cover body. The mounts are respectively provided on outer sides of the ledges and respectively have a first matching portion at an inner side of the end of the mount of the first cover shell and a second matching portion at an inner side of the end of the mount of the second cover shell. The two matching portions are complementary in shape to be engaged with each other. The two cover shells are fit tightly with two ends of a stator of the motor, and the ends of the mounts of the two cover shells are contacted to each other in pairs and are fastened with each other by screws such that the two cover shells are firmly connected.

DETAILED DESCRIPTION OF THE INVENTION

Figure 7:
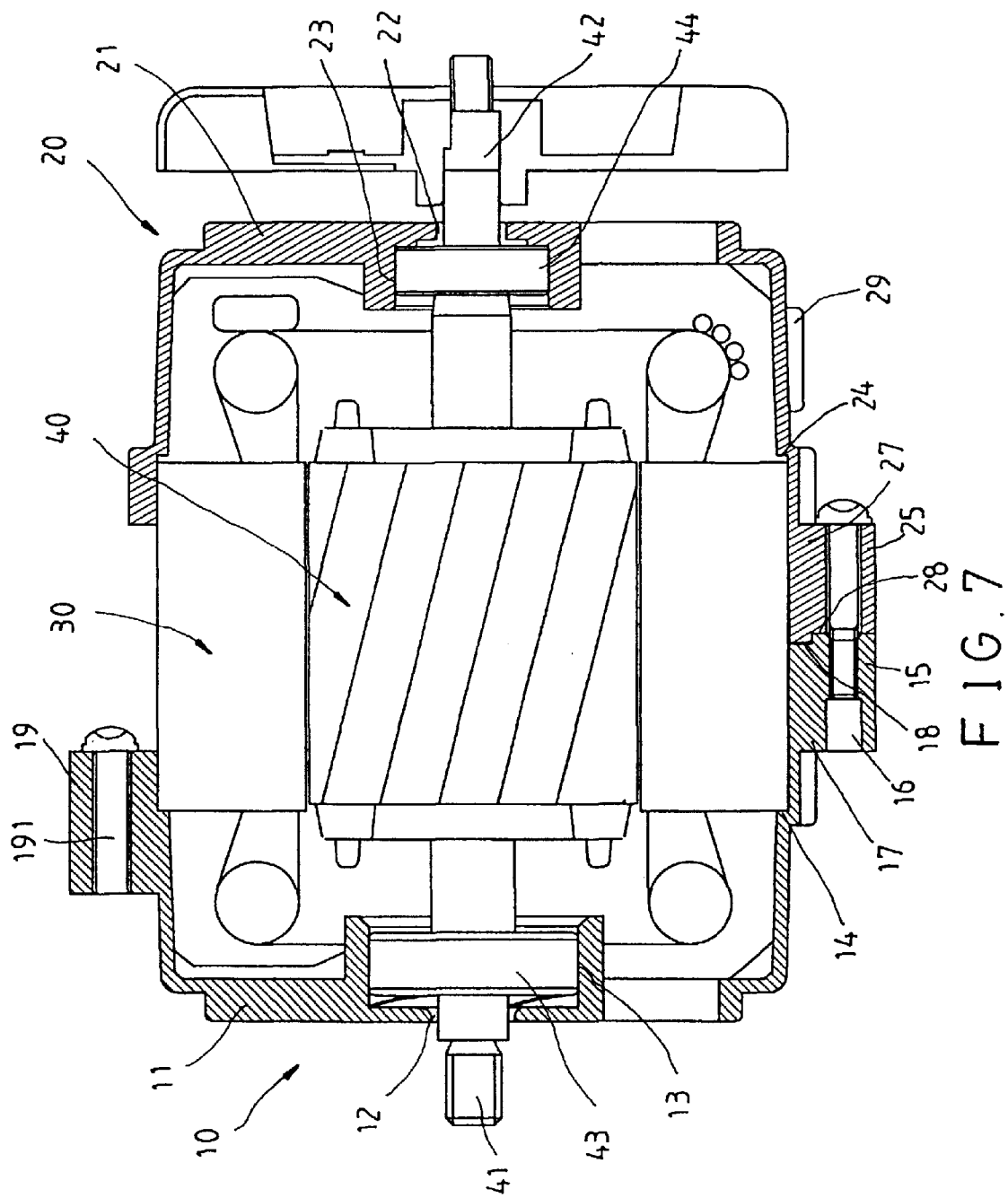
FIG. 7 is a schematic view of the first preferred embodiment of the present invention at work.

As shown in FIG. 7, an improved motor housing of a first embodiment of the present invention is composed of a first cover shell 10 and a second cover shell 20.

Figure 2:
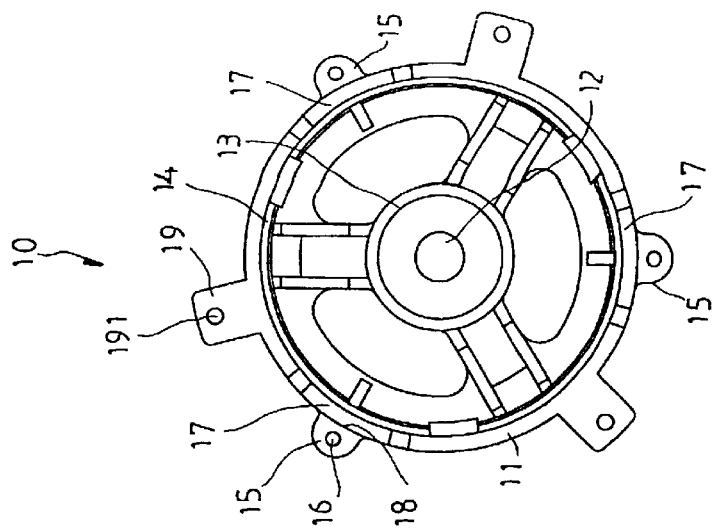
FIG. 2 is a right view of the first cover shell of the first preferred embodiment in accordance with the present invention.
Figure 3:
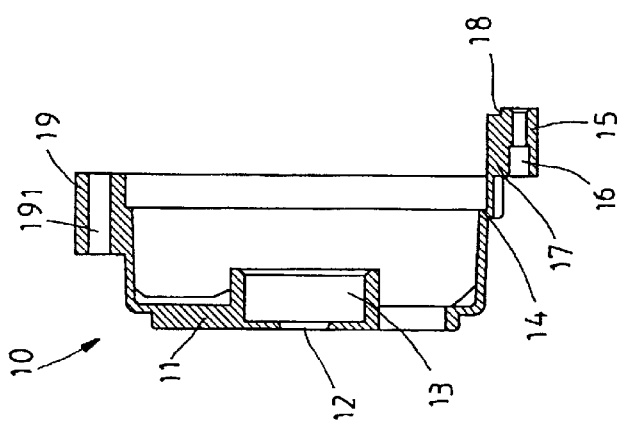
FIG. 3 is a cross-sectional view taken along the line 3—3 of FIG. 1.
Figure 1:
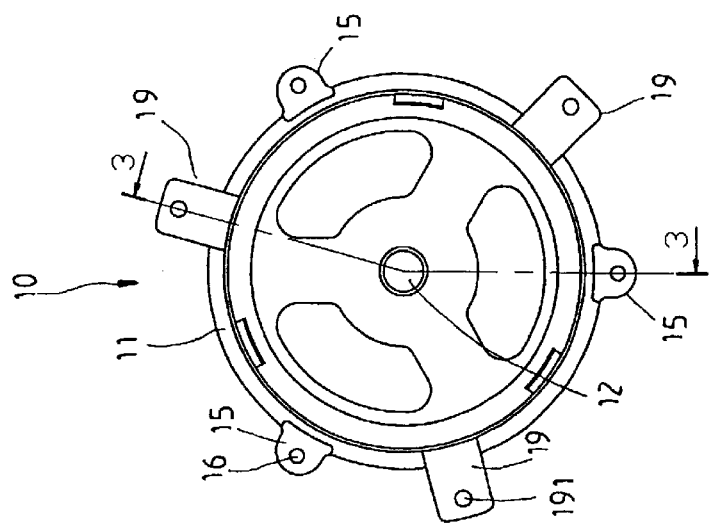
FIG. 1 is a left view of a first cover shell of a first preferred embodiment in accordance with the present invention.

Referring to FIGS. 1–3, the first cover shell 10 is integrally shaped by casting and includes a hollow cover body 11, three sheet-shaped ledges 17 and three fixing mounts 19. The hollow cover body 11 has an end opening, an axle hole 12 at a bottom center thereof, a circular chamber 13 at an inner side thereof coaxial to the axle hole 12, and a stop portion 14, e.g. an annular stepped portion in the present embodiment, at the inner wall thereof. The three ledges 17 are equiangularly provided at the edge of the opening of the cover body 11 and are protruded outwardly along an axle of the cover body 11. Each ledge 17 includes a mount 15 at the outer side thereof. The mount 15 has a threaded hole 16 therethrough which is provided with an inner thread therein. A first matching portion 18 is formed at an inner side of the end of the mount 15. The three fixing mounts 19 are equiangularly provided at an outer periphery of the cover body 11 and are in positions different from the three mounts 15 and respectively have a through hole 191.

Figure 5:
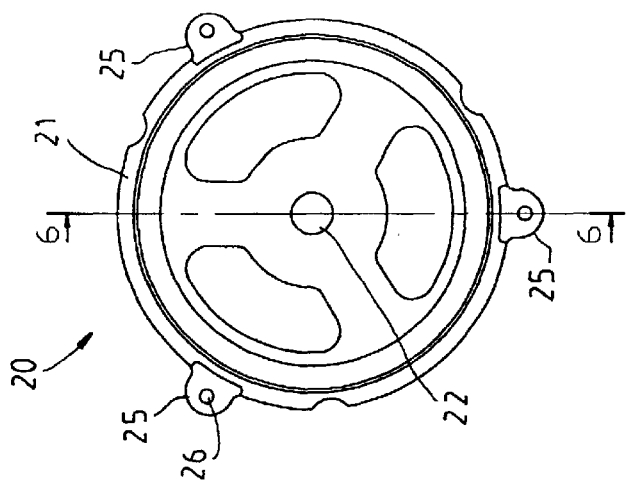
FIG. 5 is a right view of the second cover shell of the first preferred embodiment in accordance with the present invention.
Figure 6:
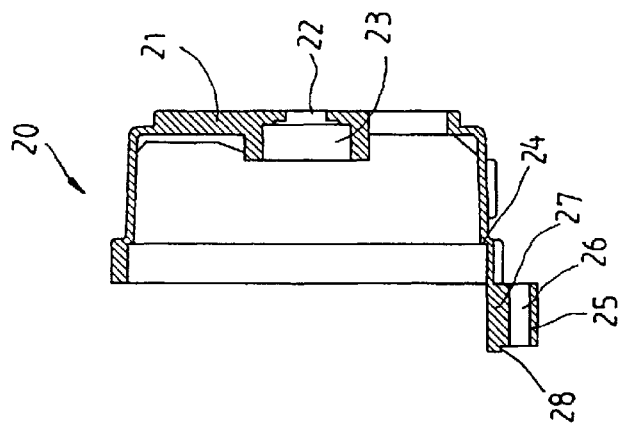
FIG. 6 is a cross-sectional view taken along the line 6—6 of FIG. 5.
Figure 4:
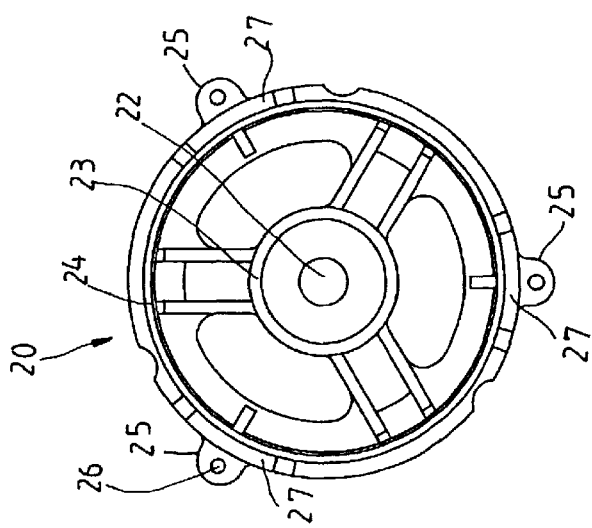
FIG. 4 is a left view of a second cover shell of the first preferred embodiment in accordance with the present invention.

Referring to FIGS. 4–6, the second cover shell 20 is also integrally shaped by casting and is substantially similar to the first cover shell 10 in shape. The second cover shell includes a hollow cover body 21 and three sheet-shaped ledges 27. The hollow cover body 21 has an end opening, an axle hole 22 at a bottom center thereof, a circular chamber 23 at an inner side thereof coaxial to the axle hole 22, and a stop portion 24, e.g. an annular stepped portion in the present embodiment, at the inner wall thereof. The three ledges 27 are equiangularly provided at the edge of the opening of the cover body 21 and are protruded outwardly along an axle of the cover body 21. Each ledge 27 includes a mount 25 at the outer side thereof. The mount 25 has a threaded hole 26 therethrough which is provided with an inner thread therein. A second matching portion 28 is formed at an inner side of the end of the mount 25. A wire hole 29 is provided at the periphery of the cover body 21 for electric wires of a stator 30 of a motor running through.

Referring to FIG. 7, the assembling process of the aforesaid motor housing is described hereunder. The two cover shells 10 and 20 are fit tightly with two ends of the stator 30 by the stop portions 14 and 24 engaged with the two ends of the stator 30. Two bearings 43 and 44 located at two ends of a rotor 40 of the motor are respectively received in the circular chambers 13 and 23 of the two cover shells 10 and 20. Two spindles 41 and 42 located at the two ends of the rotor 40 are respectively extending out of the axle holes 12 and 22. The mounts 15 and 25 of the two cover shells 10 and 20 correspond to each other in pairs and are contacted with corresponding ends thereof. The first matching portion 18 and the second matching portion 28 are complementary in shape and are engaged with each other, such that the two cover shells are coaxially matched without radial displacement. The corresponding ends of the mounts 15 and 25 are substantially positioned at the center of the motor housing, i.e. at the middle point of a space between the two cover bodies 11 and 21, and are formed as a connecting portion. Screws are inserted through from the mounts 25 of the second cover shell 20 to the mounts 15 of the first cover shell 10, such that the two cover shells 10 and 20 are threadedly connected and positioned.

The present invention, in which the ends of the mounts 15 and 25 are already contacted while the two cover shells 10 and 20 are fit tightly with each other and the two cover shells 10 and 20 are directly connected by screws, is structurally better than the prior art, in which the two cover shells have to be rotated for the mounts corresponding to each other and then inserting the screws, and efficiently promotes production.

Moreover, when the two cover shells 10 and 20 are connected with each other by means of contacting the ends of the mounts 15 and 25 directly and inserting screws therebetween, a small gap is formed between the two cover shells 10 and 20 and the stator 30, such that a length between two ends of the motor housing will not be influenced by the stator 30 after the two cover shells 10 and 20 are fixedly connected. Accordingly, the deviation of the length of the two ends of the motor housing is nothing but the total amount of the dimensional deviation of the two cover shells. The deviation of a length, which the two spindles 41 and 42 of the rotor 40 extend out of the motor housing, is reduced and the precision and stability of the products are increased.

Figure 8:
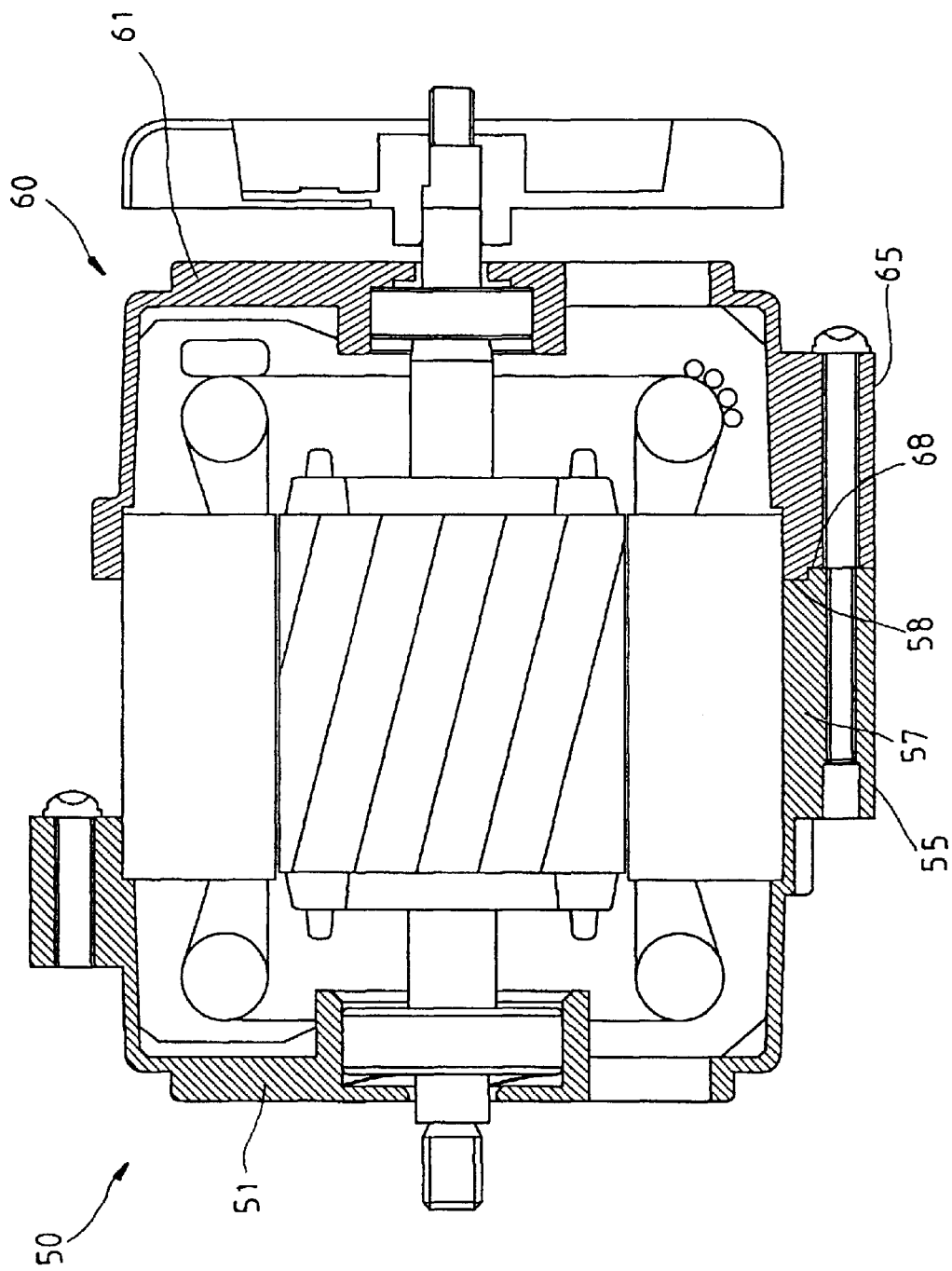
FIG. 8 is a schematic view of a second preferred embodiment of the present invention at work.

Referring to FIG. 8, a motor housing of a second preferred embodiment of the present invention is structurally similar to the motor housing of the first preferred embodiment and the difference is described hereunder. The second cover shell 60 is not provided with aforesaid ledges and the mounts 65 are integrally shaped on the outer periphery of the cover body 61, and the second matching portion 68 is formed at the inner side of the end of the mount 65. The ledge 57 of the first cover shell 50 is longer than the ledge 17 of the first preferred embodiment and is substantially the total amount of the ledges 17 and 27 of the two cover shells 10 and 20 of the first preferred embodiment in length. In other words, the length of the ledge 57 equals an axial length of an exposed portion of the stator. The ledge 57 is provided with a mount 55 at the outer side thereof and the first matching portion 58 is formed at the inner side of the end of the mount 55. Accordingly, when the two cover shells 50 and 60 are fit tightly with each other, the end of the mount 55 can be directly contact to the end of the mount 65 with the engagement of the first matching portion to the second matching portion, such that the aforesaid structure facilitates and accelerates the assembling process and the deviation of the precision of the products is decreased.

What is claimed is:

1. A motor housing for encompassing a stator of a motor therein, said motor housing comprising:

a first cover shell provided with a hollow cover body having an opening and a stop portion at an inner wall thereof, and at least two mounts integrally equiangularly mounted on an outer periphery of said cover body and respectively having a threaded hole thereon;

a second cover shell provided with a hollow cover body having an opening and a stop portion at an inner wall thereof, and at least two mounts integrally equiangularly mounted on an outer periphery of said cover body of said second cover shell and respectively having a threaded hole thereon;

wherein said two cover shells are connected with each other by said two openings of said two cover body facing to each other and by said stop portions engaged against two ends of the stator and ends of said mounts of said two cover shells contacting to each others in pairs, such that said two cover shells are threadedly connected and positioned relatively by inserting screws into said threaded holes respectively;

wherein at least one of said two cover shells has at least two ledges extending outwardly equiangularly from an edge of said opening of said cover body of said respective cover shell along an axle of said motor housing, and said mounts of said respective cover shell are integrally respectively mounted on outer sides of said ledges;

wherein each said mount of said first cover shell has a first matching portion at an inner side of the end thereof, and each said mount of said second cover shell has a second matching portion at an inner side of the end thereof which is complementary in shape to the first matching portion and is engaged with the first matching portion when the ends of said mounts are contacted in pairs with each other, such that said two cover shells are coaxially connected without radial displacement.

2. The motor housing as defined in claim 1, wherein both said first cover shell and said second cover shell have said ledges in equal numbers, and the corresponding ends of said mounts where the mounts are contacted are substantially positioned at the center of a space between the two cover bodies.

3. The motor housing as defined in claim 1, wherein only said first cover shell has said ledges, and said mount of said second cover shell is directly mounted on the outer periphery of said cover body of said second cover shell.

* * * * *